Figure 1:
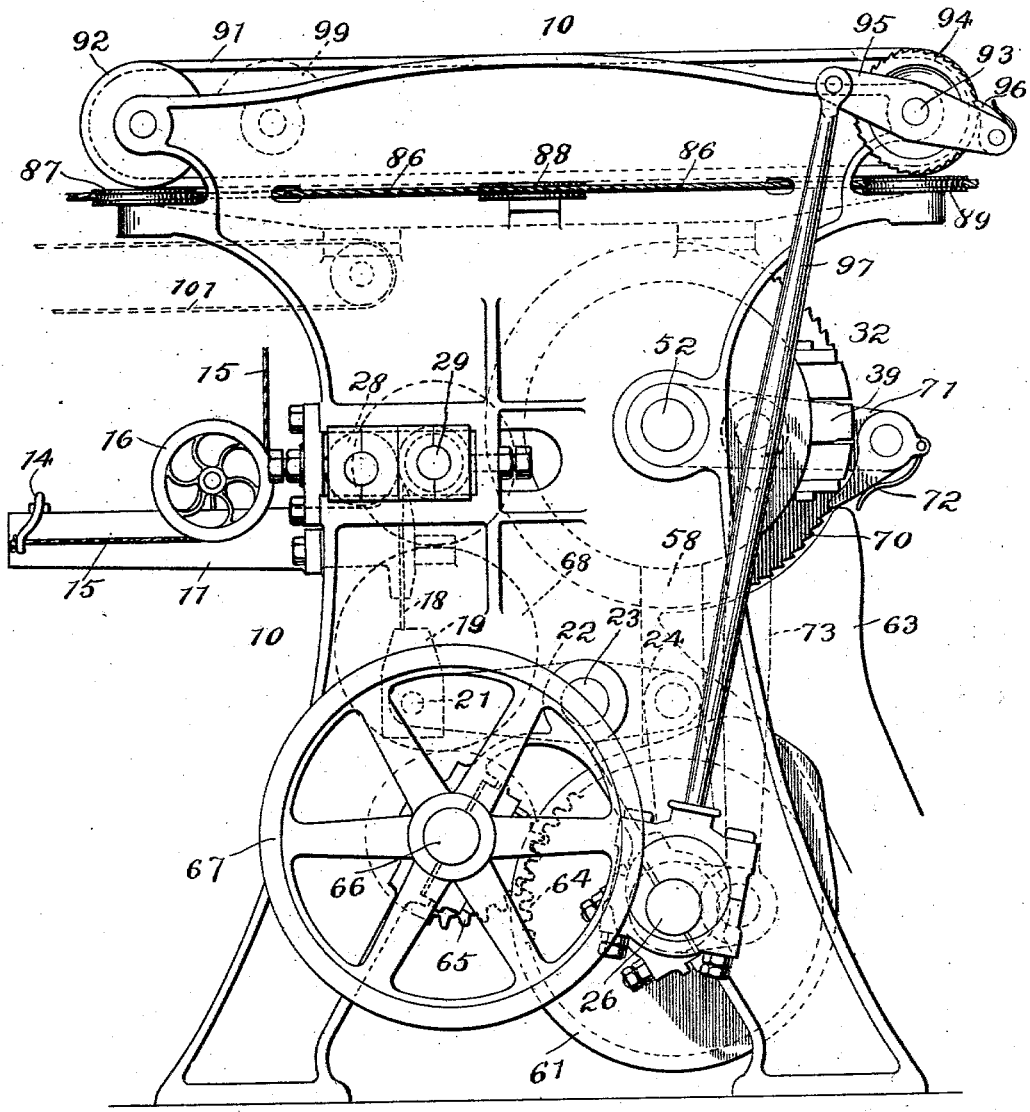

No. 716,812. Patented Dec. 23, 1902.
J. A. E. CRISWELL.
MACHINE FOR MAKING MATCHES.
(Application filed Jan. 28, 1901.)

(No Model.) 8 Sheets—Sheet 3.

WITNESSES:
William Foster
A. W. Stanley

INVENTOR
J. A. E. Criswell.

No. 716,812. Patented Dec. 23, 1902.
J. A. E. CRISWELL.
MACHINE FOR MAKING MATCHES.
(Application filed Jan. 28, 1901.)

(No Model.) 8 Sheets—Sheet 4.

WITNESSES:
William Foster
Ruth L. White

INVENTOR
J. A. E. Criswell.

No. 716,812. Patented Dec. 23, 1902.
J. A. E. CRISWELL.
MACHINE FOR MAKING MATCHES.
(Application filed Jan. 28, 1901.)
(No Model.) 8 Sheets—Sheet 5.
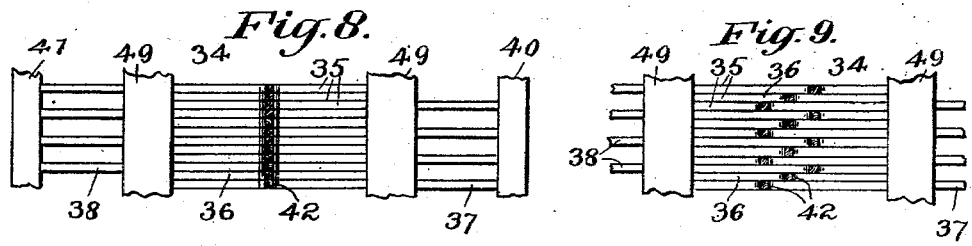
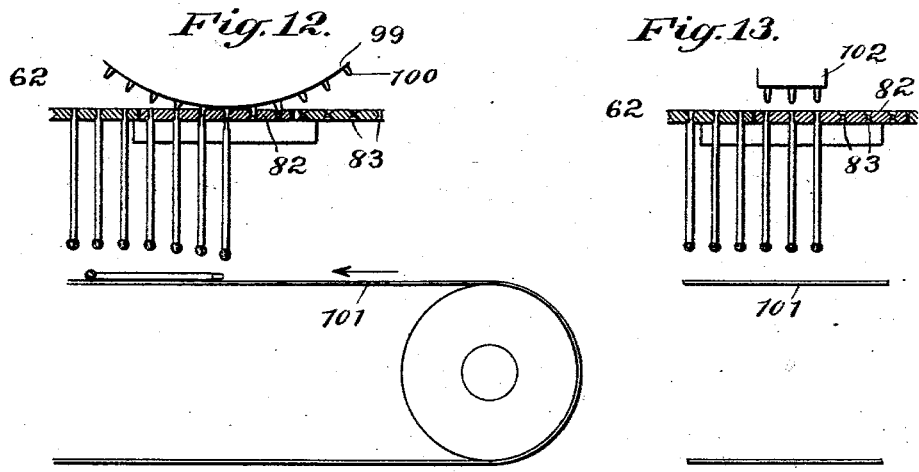
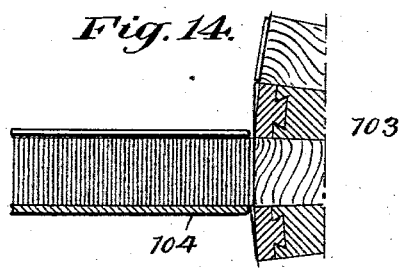
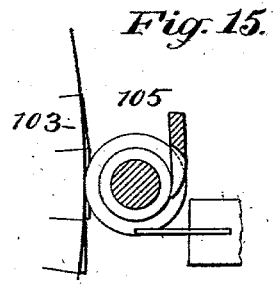
WITNESSES:
William Foster
A. W. Stanley
INVENTOR
J. A. E. Criswell No. 716,812. Patented Dec. 23, 1902.
J. A. E. CRISWELL.
MACHINE FOR MAKING MATCHES.
(Application filed Jan. 28, 1901.)
(No Model.) 8 Sheets—Sheet 6.
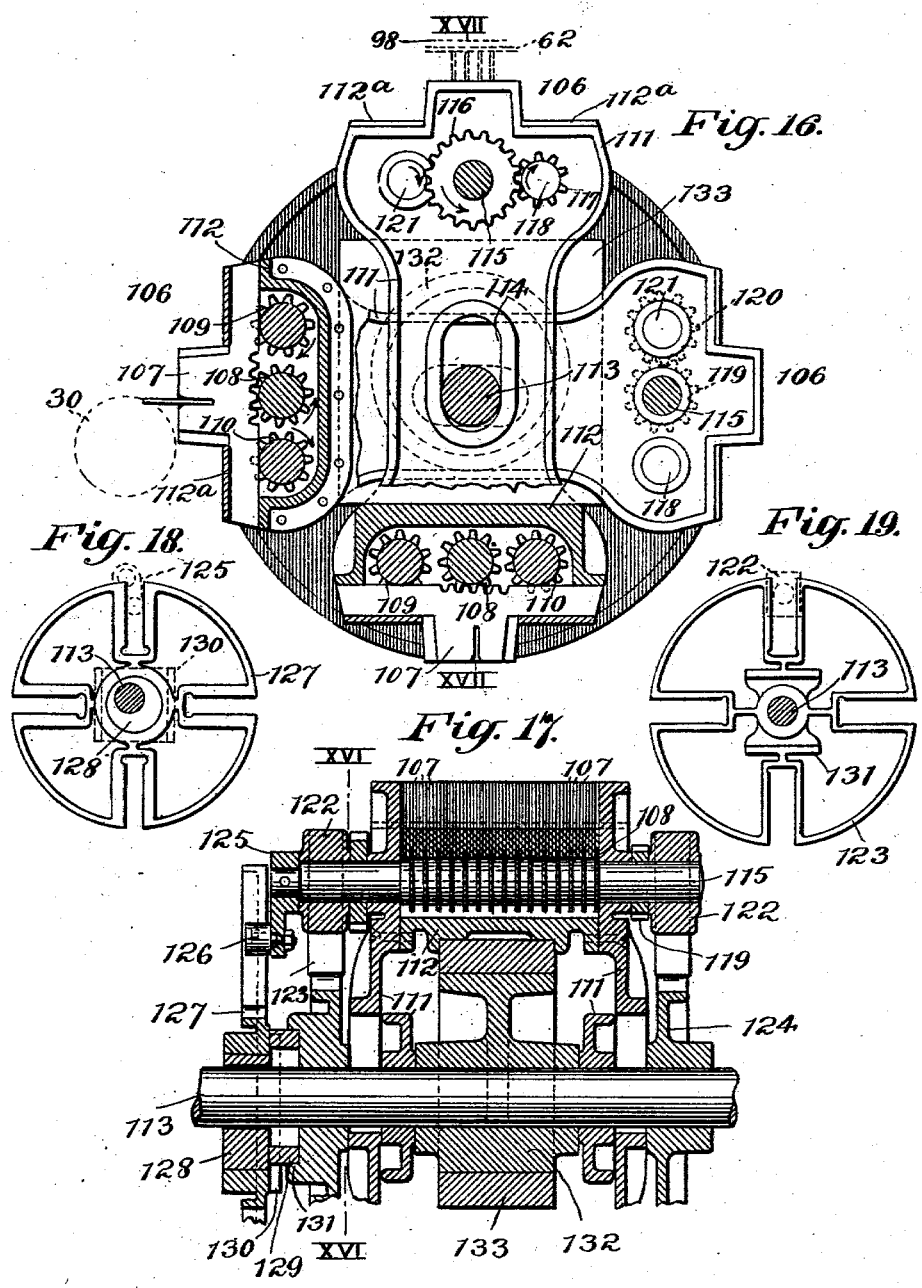

No. 716,812. Patented Dec. 23, 1902.
J. A. E. CRISWELL.
MACHINE FOR MAKING MATCHES.
(Application filed Jan. 28, 1901.)
(No Model.) 8 Sheets—Sheet 7.
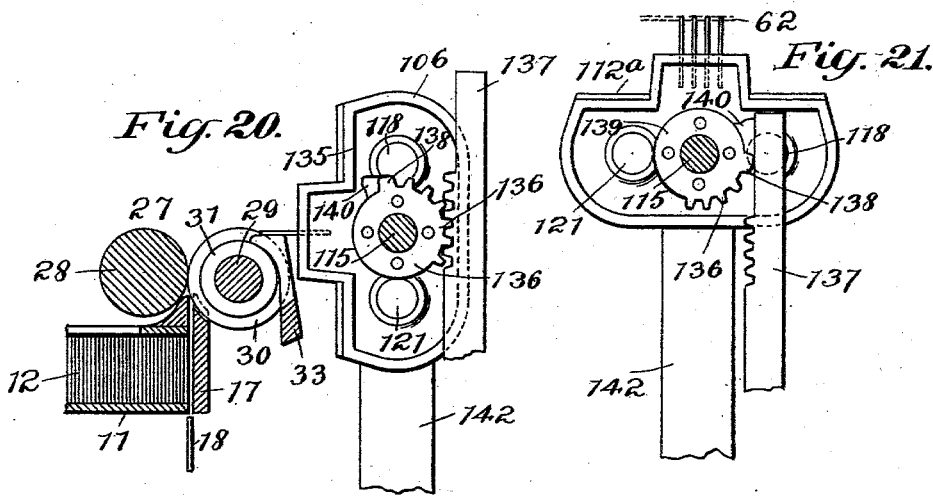
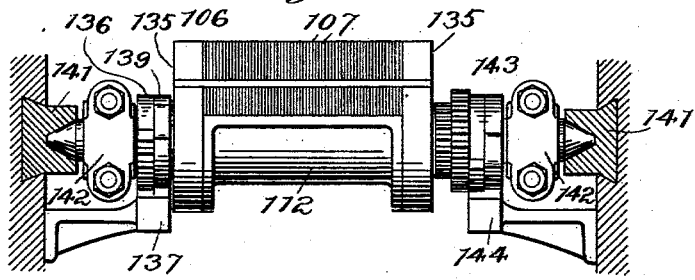
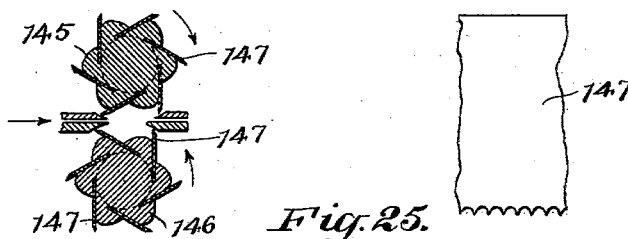
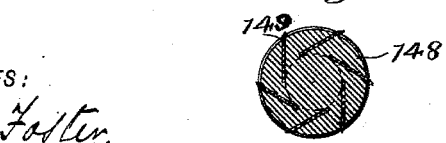
WITNESSES:
William Foster
A. W. Stanley
INVENTOR
J. A. E. Criswell No. 716,812. Patented Dec. 23, 1902.
J. A. E. CRISWELL.
MACHINE FOR MAKING MATCHES.
(Application filed Jan. 28, 1901.)
(No Model.) 8 Sheets—Sheet 8.
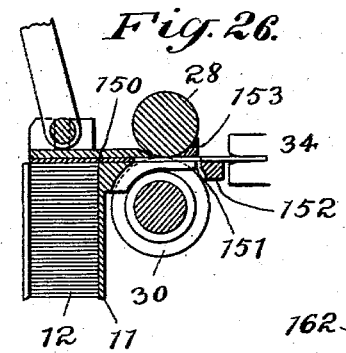
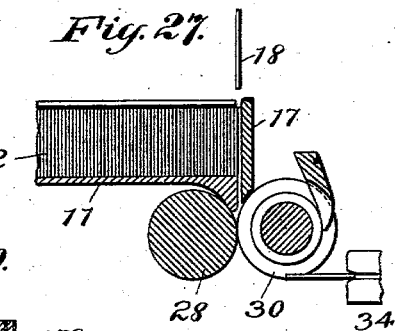
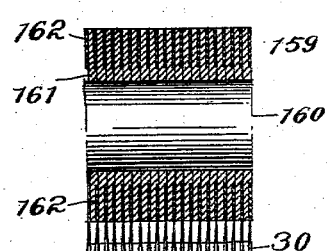
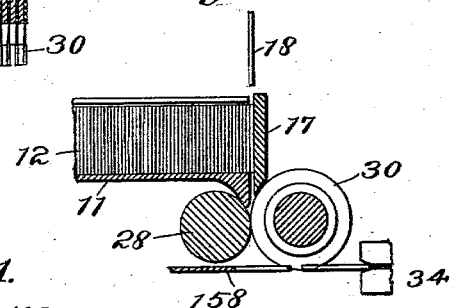
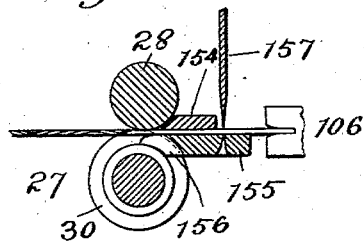
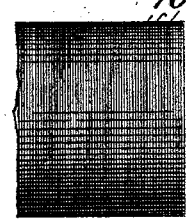
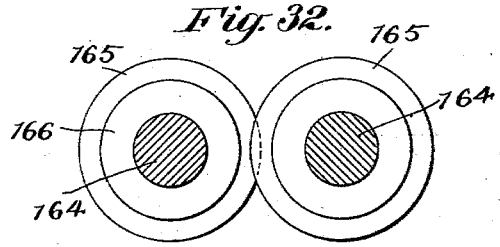
WITNESSES: William Foster H. W. Stanley
INVENTOR J. A. E. Criswell

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,812, dated December 23, 1902.

Application filed January 28, 1901. Serial No. 45,044. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to such as disclosed in my applications, Serial No. 737,186, filed November 16, 1899, Serial No. 40,001, filed December 15, 1900, and other applications in which the splints are cut from veneer.

The primary object of the invention is to provide simple and efficient means by which splints may be cut from strips, cards, or blanks of veneer, separated, and then forcibly inserted by the separator into the holding means or carrier in position for treatment to complete the matches.

A further object of the invention is to provide simple and efficient means by which the previously-cut splints are separated into a series of more than two independent rows in position to be discharged into the carrier.

Other objects of the invention are to provide simple and efficient means for handling the carrier-sections and to provide simple and efficient means for cutting the splints.

With these and other objects in view the invention consists in the construction and combination of the several parts, substantially as hereinafter described and then pointed out in the claims at the end of the description.

Figure 2:
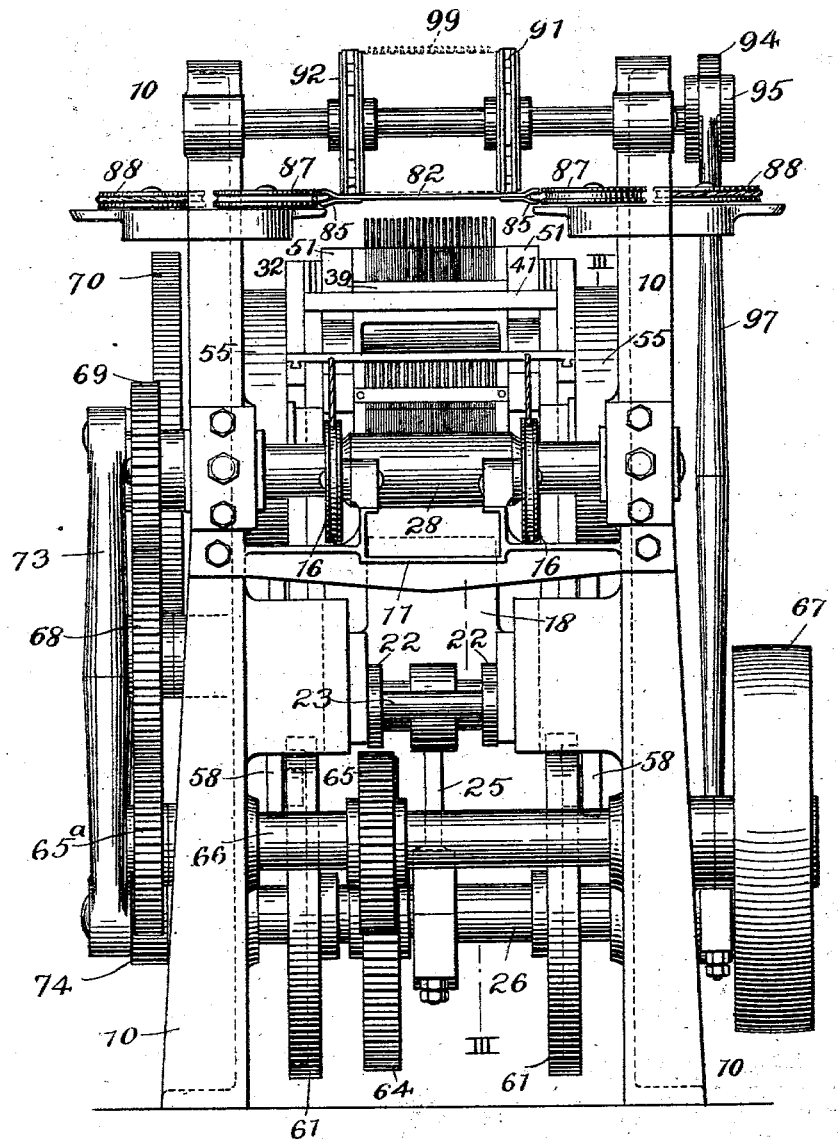
Figure 3:
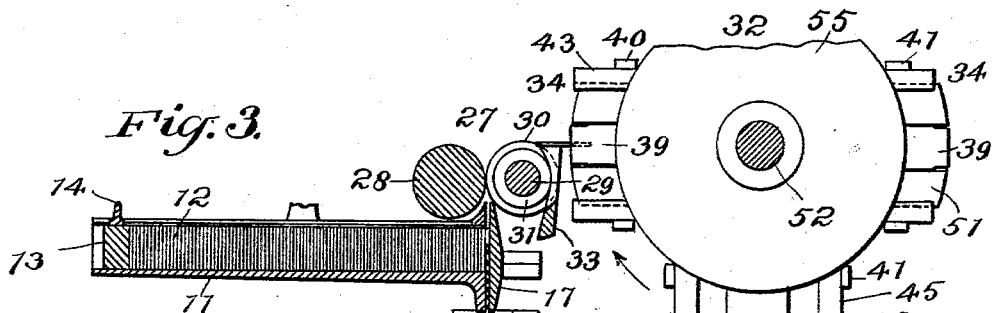
Figure 5:
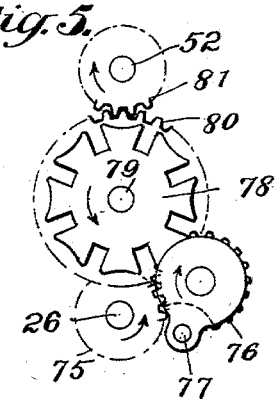
Figure 4:
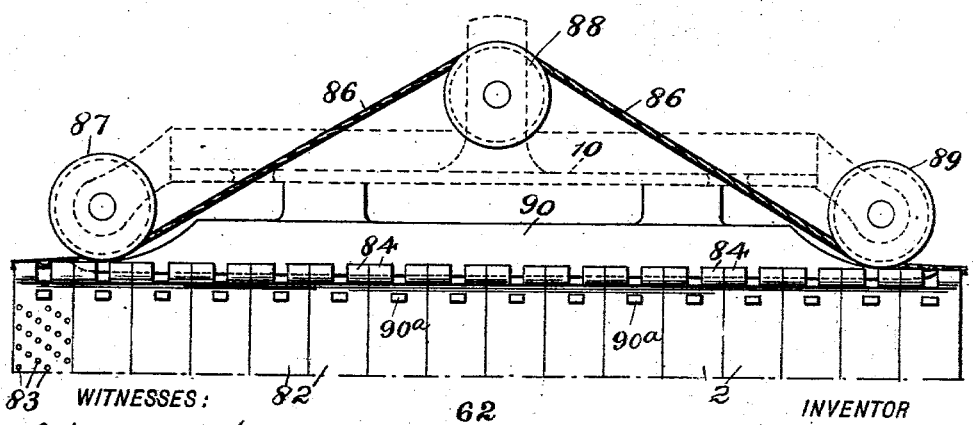
Figure 6:
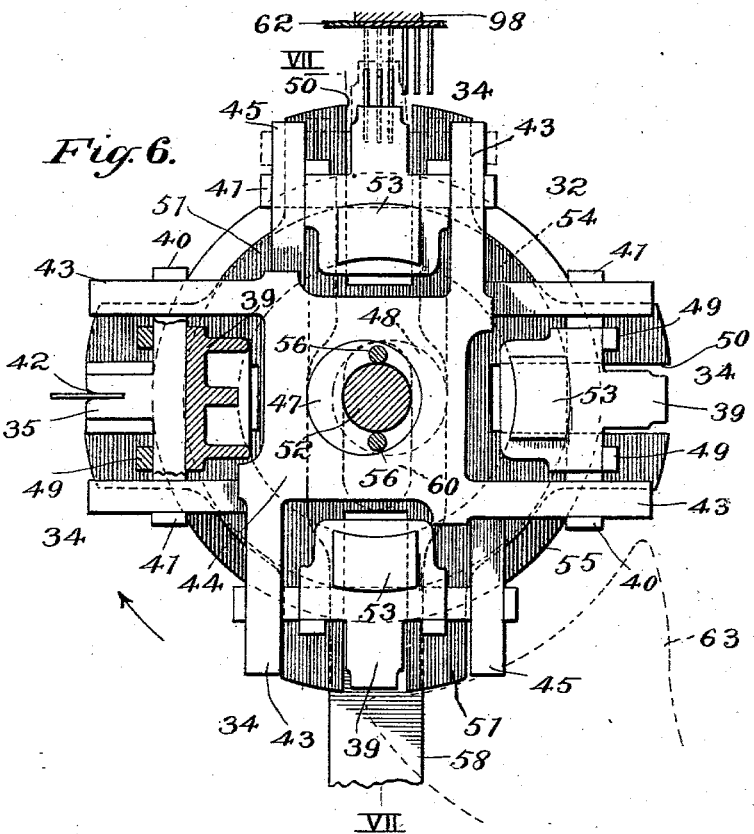
Figure 7:
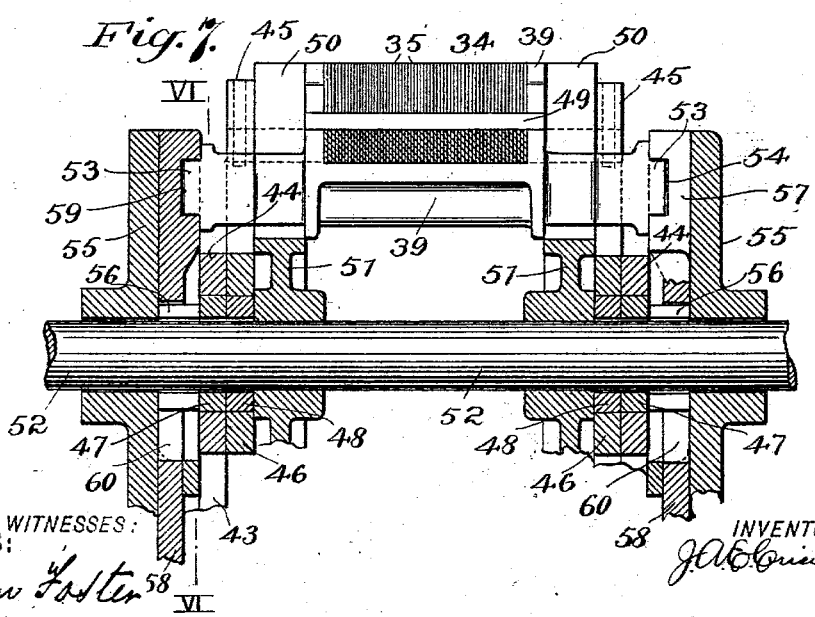

In the drawings, Figure 1 is a side elevation of one form of machine embodying my invention. Fig. 2 is an end elevation, the follower in the card-hopper being removed. Fig. 3 is a fragmentary vertical section taken on the line III III of Fig. 2. Fig. 4 is a fragmentary plan, partly diagrammatic, showing how the carrier plates or sections pass through the machine to receive the splints, the holding devices being shown in one only of the carrier-plates. Fig. 5 shows one means for operating the separator-shaft. Fig. 6 is a detail vertical section of the separator, taken on the line VI VI of Fig. 7. Fig. 7 is a fragmentary vertical section taken on the line VII VII of Fig. 6. Fig. 8 is a fragmentary detail plan of one of the separator-sections, showing the splints before they are separated. Fig. 9 is a fragmentary detail plan of one of the separator-sections, showing the splints after they are separated. Fig. 10 is a fragmentary section of one of the carrier-plates, showing how they are removably held to traveling cables. Fig. 11 is a fragmentary section of one of the carrier-plates, showing how they are guided while passing through the machine and how the jaws are held apart to receive the cables. Fig. 12 is a fragmentary section showing how the completed matches are ejected from the carrier and removed from the machine. Fig. 13 shows another means for ejecting the matches. Figs. 14 and 15 are fragmentary views showing how a rotary plunger and a cutter-roll, which cuts the cards against the plunger, may be employed to supply splints to the separator. Fig. 16 is a detail sectional view of another separator, taken on the line XVI XVI of Fig. 17. Fig. 17 is a fragmentary vertical section of the separator, taken on the line XVII XVII of Fig. 16. Figs. 18 and 19 are detail views, on a smaller scale, of parts of the separator. Figs. 20 and 21 are fragmentary sections, partly in elevation, showing different positions of a separator comprising a single section. Fig. 22 is a sectional plan showing the separator of Figs. 20 and 21 in elevation. Figs. 23, 24, and 25 show means for cutting round splints. Figs. 26 to 29 are fragmentary sections showing various means for supplying splints to the separator, and Figs. 30 to 32 show other means for cutting the splints.

The frame 10 may be of any suitable form, and projecting outward therefrom is a hopper 11, in which are placed the cards or blanks of veneer 12. The cards are of the length and thickness of the splints and are of a width sufficient to supply a number of splints. A follower 13 is slidingly held in the hopper 11, and to the follower is secured a yoke 14. This yoke has its ends extending over and to approximately the longitudinal center of the hopper and is fastened to ends of ropes or other flexible connections 15. The ropes 15 pass around pulleys 16, and their ends are suitably weighted or otherwise made to force the follower inward through the chute or hopper. The inward movement of the follower will force the inner card against a plate or backing 17 in the path of a plunger 18. This plunger is fastened to slides 19, which work in the guides 20. A transverse rod 21 has its ends held in slots in the slides 19, and connected to the transverse rod are arms 22, which are secured to a rock-shaft 23. The shaft 23 has a shorter arm 24 secured thereto, and this latter arm is connected to a strap 25 of an eccentric secured to the shaft 26, so that as the latter is rotated the plunger will be reciprocated and will successively force cards to the cutting device 27 in substantially the same manner as in my application Serial No. 737,186, hereinbefore referred to, or the cards may be forced to the cutting device in substantially the same manner as disclosed in my Patent No. 656,014, dated August 14, 1900.

The cutting device may be of any suitable form. As shown, it is substantially the same as in my patent, except that the center of the roll 28 is somewhat in advance of the center of the cutter-spindle 29 in order to more readily take the thrust direct from the cutters 30 and to permit the cutters to pass entirely through the veneer cards without coming in contact with the roll 28. The cutters are beveled from both sides and spaced apart the width of the splints by the washers 31, and as the splints are cut they will be held and carried by the cutters and forced into holding devices in a separator or carrier 32, a stripper or comb 33 being provided to prevent the splints from following the cutters too far and serve as a guide for the splints, as best shown in Fig. 3.

To separate the splints and to cause them to enter the carrier or suitable holding devices, various means may be employed. As shown in Figs. 1 to 9, the separator or carrier 32 comprises several sections 34, each in themselves an independent separator, and though four independent sections are shown this number may vary, as desired. Each section comprises a series of sets of plates or members, according to the number of independent rows into which the splints are to be divided. In this case there are three rows and three sets of plates, though it will be understood that the invention is not limited to this number. The plates or members 35 are substantially T-shaped, and one set, as 36, is stationary, and the other two sets 37 and 38 are movable, and all are held in a slide 39. The set of plates or members 37, Figs. 8 and 9, is secured to a cross-bar 40, and the set 38 is secured to the cross-bar 41. Each member or plate is provided with a slot, receiver, or holding device 42 of a depth sufficient to properly hold one splint, and at a point opposite the cutters all of the holding devices register to form a common groove or channel, as shown in Figs. 3, 6, and 8. The cross-bars 40 are slidingly held, as by a tongue-and-groove connection, to outwardly-projecting arms 43 of the blocks or straps 44, and the cross-bars 41 are similarly secured to the arms 45 of the blocks or straps 46, so as to permit the cross-rods to slide lengthwise of the arms without operating or shifting the position of the sets of plates. The arms of the sets of blocks 44 and 46 are staggered, and the arms on the same side of the blocks are arranged at right angles to each other, and both sets of blocks and arms are similarly constructed, except that the arms 43 are made to extend on one side of the slides 39, while the arms 45 extend on the other side to engage the cross-bars 41. The blocks 44 move around stationary eccentrics 47 and the blocks 46 move around the oppositely-arranged stationary eccentrics 48, and when rotated, as hereinafter explained, cross-bars 40 and 41 in moving from a horizontal to a vertical position will be forced toward each other, thereby separating the splints into a series of independent rows, as best shown in Figs. 6 and 9. The movable plates or members are held in the slides 39 by the cross-bars 49, and said slides are held to move in the slots 50 of the wheels 51. These wheels are fixed to a rotary shaft 52, which is suitably journaled in the frame 10, and said wheels are cut away to form supporting-arms for the sections and to prevent interference with the cross-bars 40 and 41. The ends 53 of the slides 39 extend beyond the eccentric-blocks and normally move in annular grooves 54 in the stationary disks 55, which are fastened to the frame 10, and to these disks are held the eccentrics 47 and 48, as by the rods 56. The disks 55 are each cut away or formed with a vertical groove or way 57, in which is slidingly held a bar 58. These bars are each provided with a groove or recess 59, adapted to normally register with and form a continuation of the cut-away part of the groove 54. Each lever is provided with a slot 60 to span the shaft 52 and is reciprocated by a cam 61, secured to the rotary shaft 26. It will be seen that as the shaft 52 is rotated the wheels 51 will rotate the slides 39 therewith, and the ends of said slides will move in the annular grooves 54 in the stationary disks 55 until the ends of the slide of the upper section move into the grooves 59 of the bars 58. During this quarter of a revolution the blocks 44 and 46, rotating around the eccentrics 47 and 48, will shift the two movable sets of plates or members 37 and 38 and will separate the splints into three independent rows, as already explained and shown in Figs. 6, 8, and 9. As soon as the splints are separated and they are in a vertical position the cams 61 will suddenly force the levers upward, so as to carry therewith the slide whose ends are in the grooves of the levers. This movement will stick the splints into the holding devices of the carrier 62, and owing to the shape of the grooves in the cams 61 and the rollers which ride in said grooves the slide will be suddenly returned, leaving the separated splints in the carrier and in position to pass from the grooves in the ends of the bars 58 and again enter the annular grooves in the disks 55, when the shaft is given another intermittent movement of one-quarter revolution. During three-quarters of each rotation or any part thereof the separator-sections may be acted upon by any suitable means, as by an air suction, for removing fiber, dust, and the like which might remain in the separator-sections, a pipe 63, having a flared mouth and adapted to be connected to an exhaust-fan or other means, being shown for this purpose. By this means the splints are received direct from the cutters, carried and separated into independent rows to the side of and out of the plane of the cutters, and then positively forced into the holding devices of the carrier.

Any suitable timing and operating mechanism may be employed to operate the several parts. The shaft 26 has a gear 64, which is in mesh with a smaller gear 65 on the main driving-shaft 66, the latter being provided with a belt-pulley 67. An idler 68 is in mesh with the gear $65^a$ and with the gear 69 on the cutter-spindle 29, this latter shaft being geared to the shaft of the roll 28 or not, as desired. The shaft 52 has a ratchet-wheel 70 secured thereto and an arm 71 loosely held to the shaft. This arm carries a pawl 72, adapted to engage the teeth of the ratchet-wheel, and to the arm 71 is connected a rod 73, operated by a crank 74 on the shaft 26, so that at each rotation of the shaft 26 the separator will be given one-quarter of a rotation. Instead of this ratchet mechanism a modified Geneva movement, as in Fig. 5, might be employed. In this case the shaft 26 has a gear 75, which is in mesh with a gear 76. The shaft of this gear carries an arm on which is a stud 77, and this stud is adapted to enter slots in a wheel or disk 78, the periphery of the latter being curved between the slots and adapted to be engaged by a disk to lock the wheel during the greater part of the rotation of the shaft of the gear 76, as is usual. The shaft 79 of the slotted wheel carries a gear 80, that meshes with a smaller gear 81 on the shaft 52, and the two gears are so proportioned that the shaft 52 will move one-quarter of a revolution at each revolution of the stud 77.

The carrier and means for handling the carrier or the holding means for completing the matches may be of any suitable construction, and the splints and holding-sections of the carrier may be taken and the matches completed by hand, or they may be made to pass continuously through the machine and the matches completed and ejected automatically. As shown, the carrier 62 comprises a series of independent strips or plates 82, in which are the usual round holes 83, adapted to hold the splints therein in the usual manner. These holes in the devices or plates 82 are arranged in rows and are staggered to correspond to the position of the splints in the separator 32. Each device or plate 82 has at each end one or more fixed jaws 84 and under the fixed jaw or jaws a movable clamping-jaw 85, though it is to be understood that either or both may be movable and may be variously constructed. The lower jaw or jaws 85 is of spring material and, together with the jaw 84, form a socket for a cable or other flexible connection 86, in which the cable is normally clamped and held, though the movable jaw or jaws may be forced so as to clamp the cable or other carrying means in any desired manner. The carrier-plates enter the machine at the front, and as they do so the cables are released therefrom and pass around pulleys 87, through openings in the frame, to and around pulleys 88, in through openings in the frame again, and then around the pulleys 89 to receive and again take up the carrier-plates. The plates immediately or before they are entirely released pass onto the rails 90, secured to the frame, which latter may be of such form as will spread the jaws of the carrier-plates apart to permit the cables to enter between them more readily. Each plate has one or more teeth or projections $90^a$ at each side, which are engaged by the endless chains 91 and by which the plates now free are forced along the tables or rails 90 with a step-by-step movement, though other means than the chains 91 might be used. The endless chains 91 pass around the pulleys 92, and on the shaft 93 of one set of pulleys is a ratchet-wheel 94. Arms 95 carry a pawl 96, which engages the teeth of the ratchet-wheel, and to the arms is connected a rod 97, which is operated by an eccentric on the shaft 26. As the eccentric is operated the ratchet-and-pawl mechanism will move the chains 91 and the carrier-plates engaged thereby with a step-by-step movement the proper distance to receive the splints from the separator, a plate 98 or other means being provided to take the thrust during the sticking of the splints. The rails 90 may be so shaped as to open the jaws at the proper time to release and to receive the cables. The carrier devices or plates after being filled with splints may be carried from the machine by the cables and the matches completed automatically, or the separate plates may be again released and the matches completed by hand. If the splints are to be parafined, headed, &c., automatically and continuously, the plates are not again released from the cables until they return with the completed matches to the machine. In this case a roller or drum 99 (shown in dotted lines in Figs. 1 and 2 and in full lines in Fig. 12) is provided. This drum has projecting teeth or pegs 100, corresponding in position to the rows of holes in the carrier-plates, and as the plates pass under the drum the matches will be ejected therefrom. The drum 99 may be rotated by the endless chains 91 or otherwise, and as the matches are ejected they may be made to fall upon a traveling belt or apron 101, to be carried to boxing machinery or otherwise handled, the apron being shown in dotted lines in Fig. 1 and in full lines in Fig. 12. Instead of the ejecting-drum a reciprocating plunger-head 102, as shown in Fig. 13, might be used. By having the carrier-plates removably held to the cables the latter may be moved continuously and at any desired speed without intermittently stopping the entire length of carrier, and the plates may be removed from or placed in operative connection with the cables at any desired step, and, furthermore, the slack or stretch in the cables may be readily compensated for.

The carrier-plates, operated by means of cables or other flexible devices and independently movable with relation to said cables, are claimed, broadly, in my pending application, Serial No. 40,001, hereinbefore referred to.

The invention will be readily understood from the foregoing description when taken in connection with the accompanying drawings.

The main driving-shaft being operated and through this latter the various parts of the machine, as already explained, the cards 12 will be forced to the cutting device 27, and after being cut they will be carried by the cutters and forced into the holding devices of the separator. A quarter of a revolution is now given the separator, and during this movement the ends 53 of the slides 39 will ride in the grooves 54 of the disks 55. As the ends of the slides 39 move in the grooves 54 the blocks 44 and 46 in moving around their respective eccentrics and through the arms 43 and 45 and cross-bars 40 and 41 will force the two movable sets of plates or members a sufficient distance to properly separate the splints into the independent rows. The ends of the slides 39 will now rest in the grooves of the bars 58, the other ends of which are operatively connected with the grooved cams 61, and as the slides are fully engaged by the bars the cams will force said bars upward and will return them to their former position. During the upward movement of the slides the splints will be forced into the holding devices 83 of the carrier-plates 82, and said slides will be returned clear of the splints. This operation is repeated, and the carrier-plates are moved each time the proper distance to place new holding devices in position to receive the splints. The cables receive the filled plates, and after the matches are completed they may be ejected by the devices referred to and removed from the machine, as hereinbefore described.

In this application I do not claim, broadly, the feature of carrying the splints bodily and separating them into independent rows nor broadly to carrying separated rows of splints away from the cutting mechanism or source of supply and forcing them into dipping frames or carriers, as such is claimed in my application, Serial No. 737,186, filed November 16, 1899. I also do not claim herein, broadly, the feature of separable receivers and means for separating such receivers either into independent rows or otherwise, as such is claimed in my divisional application, Serial No. 52,005, filed March 20, 1901, and rotary means or rotary devices for carrying the splints and for separating them into more than two independent rows is also claimed, broadly, in my pending application, Serial No. 40,001, filed December 15, 1900.

In Figs. 14 and 15 the splints are cut and fed to the cutting device in a manner similar to that shown in my application, Serial No. 40,001, hereinbefore referred to. The rotary plunger 103 removes the cards from the hopper 104 and carries them to a cutting device 105 in precisely the same manner as described and claimed in said application, and the splints are then forced into the separator, separated, and then forced into the carrier, as already described.

The separator (shown in Figs. 16 to 19, inclusive) receives the splints from any suitable source and comprises a series of independent sections 106. These sections or separators each comprise a series of sets of plates or members similar to those shown in Figs. 1 to 9. In the latter instance the plates are arranged in three sets, while in the present case there are four sets of plates 107, though this number may vary. One set of plates is stationary and the other three are movable, and each movable set of plates have teeth on their lower surface which mesh with a roll of gears. The teeth of one set are operated by the gears 108, a second set by gears 109, and the third movable set by gears 110, and said movable sets are slidingly held in the sections, the latter being carried by the arms 111. The arms 111 are connected together in pairs by the brackets 112 of the sections, and said brackets serve also as a support for the plates 107 and as an inclosure for the sets of gears, two bars or plates 112ᵃ serving to retain the plates in the sections. Each pair of arms is adapted to hold or support and carry two of the sections 106. The pairs of arms are arranged at right angles to each other and span a shaft 113, and said arms are slotted, as at 114, to permit lengthwise movement of the arms, for a purpose to be presently described. The gear-shaft 115 of each section 106 has a gear 116, which meshes with a gear 117 on the gear-shaft 118. A gear 119 also on each shaft 115 meshes with a gear 120 on the gear-shaft 121, and as the shaft 115 is rotated the gears just referred to will rotate the shafts 118 and 121 in the direction indicated and will shift the several sets of plates the proper distance, and thereby separate the splints into the independent rows. The shafts 115 are provided with blocks 122, and these blocks are slidingly held in slots in the wheels or disks 123 and 124, located on opposite sides of the pairs of arms 111. The wheels are given an intermittent movement by any suitable means, which will also rotate the sections 106 and arms 111, said wheels being loose on the shaft 113, but so arranged as to rotate both with or independently thereof.

The specific form of separator and the specific means for operating the devices for forcing the splints into the carrier shown in Figs. 16 to 19 is claimed in my pending application, Serial No. 54,618, filed April 6, 1901, and my pending application, Serial No. 56,343, filed April 18, 1901.

The shafts 115 each carry an arm 125, which projects inward and has a roll 126, slidingly held in a slot in a disk 127. This disk moves around a stationary eccentric 128, fixed to one of the bearings or otherwise, and is held to rotate with the wheel 123. To permit this, a rectangular block 129 is held between the guides 130 on the disk 127 and guides 131 on the hub of the wheel 123, so as to provide a form of universal connection between said disk and wheel. An eccentric 132 is fixed to the shaft 113 and works within a rectangular block 133, each side of which is movably held against the inner surface of one of the brackets 112. The shaft 113, the arms 111, and the sections 106 normally rotate together, and as they rotate the disk 127 in riding around the stationary eccentric 128 will shift the arms 125 and through the shafts 115 and gears connected therewith will operate the sets of plates or members to separate the splints into independent parallel rows. The splints are received in a common plane and while being carried a quarter of a revolution will be fully and properly separated, as already explained, in a plane at right angles to the plane in which they are received. A full revolution is now given the shaft 113, and by means of the eccentric 132 the block 133 will be moved, and through this latter the arms and section containing the separated splints will be moved toward the carrier, so as to positively force or insert the separated splints into said carrier and then will be returned free of the splints. At the same time that the section holding the separated splints is sticking the latter the section to receive the splints is being forced toward the incoming splints to receive them and again move away, the position of the parts being shown as when the shaft has made only one-half of its independent revolution. The slots in the wheels and the slots in the disk 127 are in such a position during the receiving and discharging of the splints as will permit the parts fitting therein to slide without altering the position of the parts connected therewith.

In Figs. 20 to 22 the splints are held in a frame 134 and are separated by the sets of plates and rotary gear-shafts substantially as described in Figs. 16 to 19. The splints may be fed to the separator section or carrier as shown, which is substantially the same as in Fig. 3, though they may be cut and fed to the section in any suitable manner. Fastened to the frame 135 and movable around the shaft 115 is a segmental gear 136, the teeth of which engage a rack 137, that is held stationary on the frame. The gear 136 has a false tooth 138, and beside the gear 137 is a disk 139, which is fastened to the gear and to the frame, and said disk has a foot 140, which is adapted to rest against and slide along the straight surface of the rack 137. The shaft 115 is extended and has its outer ends rotatably held in sliding blocks 141, and said shaft and frame are moved lengthwise of the rack 137 by the connecting-rods 142. As the rods are reciprocated the separator or carrier will be rotated by the segmental gear 136 and rack 137 until the foot 140 rests on the straight portion of the rack, along which it will slide, so as to hold the separator-section in a fixed position and to force the separated splints into the carrier or other holding means, as shown in Fig. 21. On the return stroke of the rods the section will be moved free of the splints, and as soon as the tooth 138 strikes the front tooth of the rack it will cause the teeth of the gear 136 to again mesh with the rack and will restore the section to the position shown in Fig. 20, ready to again receive splints. The splints are separated during the rotary movement of the separator. This is accomplished by arranging a form of movement substantially as described on the shaft 115 and on the opposite side of the section, as at 143. This movement works in connection with a stationary rack 144, similar to rack 137, the teeth of the gear and the rack 144 being such that it will rotate the shaft 115 the proper distance. The shafts 115, 118, and 121 are geared together, so as to move the sets of plates the proper distance, as previously described, except that all the gears connecting the gear-rolls are placed on one side of the separator or section 135.

The form of machine shown in Figs. 20 to 22, inclusive, is claimed in a separate application, Serial No. 55,448, filed April 12, 1901.

The cutting mechanism so far referred to cuts splints which are substantially rectangular. It is obvious that round or so-called "round" splints or other forms may be also cut and fed to the separating mechanism. In Fig. 23 is shown two rolls 145 and 146, carrying a series of knives 147. These knives are fluted, so as to score the veneer, one set of knives scoring one side of the veneer and the other set of knives the other side of the veneer and both together cutting the veneer into splints, according to the shape of the cutting edge of the knives. The veneer is fed between the cutting-rolls while the latter are rotated very fast in a direction opposed to the direction of movement of the veneer.

In Fig. 25 the cutting-roll 148 has a continuous bearing-surface between the cutting-knives 149; otherwise it is the same as in Fig. 23.

The cutting device shown in Fig. 26 is substantially like that already described, and instead of the splints being carried around to a plane at approximately right angles to the hopper the splints are cut by the cutters, and the plunger 150 has its end slotted to pass by said cutters and has a stroke sufficient to force the splints into the holding devices of the separator section or sections. Fingers 151 project from the hopper and prevent the splints following the cutters, and the guides 152 and 153 assist in guiding the splints while being forced into the holding-separator section.

Fig. 27 shows a structure similar to that shown in Figs. 1, 2, and 3, except that the hopper is above the cutting device, while in Fig. 28 the veneer is fed in long strips or blanks. In this latter case the cutting device is similar to that already described, and as the splints are cut they pass between the guide 154 and the table 155. The guide 154 prevents the splints from following the roll 28, and the table 155 is provided with fingers 156, which enter between the cutters and strip the splints therefrom. A reciprocating or other knife 157 moves over the table 156 and cuts the splints transversely the proper length while the ends are held in the holding devices of the separator section or sections.

In Fig. 29 the cutting device, hopper, and manner of feeding the cards or strips the proper length to the cutting device are the same as already described. The roll 28 is made somewhat smaller in diameter, and working beneath the roll is a second plunger device 158, which has its ends slotted and is so timed that it will force the splints from the cutters into the separator-section. A stripper or comb may be employed to prevent the splints from passing beyond a horizontal plane, and the separator may be placed far enough away to move the splints after receiving them clear of the cutters.

In Fig. 30 the roll 159 has a shaft 160, on which are preferably metallic washers 161. These washers are reduced at one side to form an annular groove, in which are held compactly paper or other washers 162. The washers 161 and 162 are held together on the shaft 160, so as to form a continuous bearing for one side of the cards, and the washers 162, of paper or cardboard, present a hard surface, yet permit the edges of the cutters to enter them to entirely sever the splints. This permits perfectly clean and smooth splints to be cut. Instead of cardboard or thin strips of paper as washers rubber, rawhide, or other material may be employed, if desired.

In Fig. 31 the roll is made up of closely-fitting laminated sheets or washers 163, which are compact enough to form a substantially continuous surface for the splints.

Fig. 32 shows a cutting device in which there are two spindles 164. Each spindle has a series of knives or cutters 165, spaced apart the width of the splints by the washers 166, and the cutters of one spindle overlap those of the other. The cutters in this case are preferably beveled on one side only, and the straight surfaces of the cutters of both spindles work against each other.

It will be understood that any suitable means may be used for holding the splints and for receiving them from the separator and that the splints may be initially partly separated or that if fully separated the section will carry the splints and then force them into the carrier. It will be further understood that the shaft 52 may be stationary instead of rotary, and the separator may then be made to move around the shaft.

By the term "veneer" it will be understood that wood veneer or any material from which splints may be cut is included, and while a particular form of machine is shown some of the features may be used with other forms of machines.

Having thus described my invention, what I claim as new, and desire to secure by Letters Patent, is—

1. A match-making machine, comprising splint-cutting means, an intermittently-movable separator having a series of independent sections each receiving in succession a row of splints and separating them into a series of independent rows, and holding means for the splints.

2. In a match-making machine, the combination with splint-cutting means, of an intermittently-movable separator comprising a series of independent sections each receiving in succession a row of splints and separating them into a series of independent rows at a point away from and clear of the cutting means, and a carrier receiving in succession the separated splints from the separator-sections, substantially as and for the purpose described.

3. In a match-making machine, the combination with splint-cutting means, of an intermittently-movable separator having a series of four independent sections each receiving in succession a row of splints endwise direct from the cutting means and separating them into a series of independent rows, and holding means for the splints.

4. In a match-making machine, the combination with splint-cutting means, of an intermittently-movable separator having a series of independent sections each receiving in succession a row of splints and separating them into a series of more than two independent rows, and holding means for the splints.

5. In a match-making machine, the combination with splint-cutting means, of a separator comprising a series of intermittent circularly-moving independent sections each receiving in succession a row of splints and separating them into a series of more than two independent rows at a point away from and clear of the cutting means, and a carrier receiving in succession the separated splints, substantially as and for the purpose described.

6. In a match-making machine, the combination with splint-cutting means, of a separator having a series of intermittent circularly-moving independent sections each receiving in succession a row of splints endwise direct from the cutting means and separating them into a series of more than two independent rows, and holding means receiving the rows of splints successively from each section.

7. In a machine for making matches, the combination with splint-cutting means, of a rotary separator having a series of intermittently circularly moving independent sections each receiving in succession a row of splints and separating them into independent rows, holding means for the splints, and means for moving the sections out of the circle of their movement to forcibly insert the splints into the holding means.

8. In a machine for making matches, the combination with splint-cutting means, of a separator comprising a series of four intermittently-revoluble and independent sections each receiving in succession a row of splints and separating them into a series of independent rows at a point away from and clear of the cutting means, a carrier, and means for positively forcing the successive sections radially to stick the splints into the carrier.

9. In a match-making machine, the combination with splint-cutting means, of a separator having a series of intermittent and circularly-moving independent sections each receiving in succession a row of splints and separating them into a series of more than two independent rows, holding means for the splints, and means for moving the sections out of their circle of movement to forcibly insert the splints into the holding means.

10. In a match-making machine, the combination with splint-cutting means, of a separator comprising a series of intermittent and circularly-moving independent sections each receiving in succession a row of splints endwise and separating them into a series of more than two independent rows at a point away from and clear of the cutting means, a carrier adapted to hold splints, and means for successively moving the sections out of the circle of movement to forcibly insert the splints in the carrier, substantially as and for the purpose described.

11. In a match-making machine, the combination with splint-cutting means cutting the splints in a close row, of a separator having a series of independent and circularly-moving sections each receiving in succession a row of splints endwise direct from the cutting means and separating them into a series of more than two independent rows, a carrier, and means for successively moving the sections out of the circle of movement to forcibly insert the splints into the carrier.

12. In a match-making machine, the combination with splint-cutting means, of a separator having a series of four independent sections each receiving in succession a row of splints endwise and separating them into independent rows and moving them away from the cutting means, and holding means for the splints.

13. In a match-making machine, the combination with splint-cutting means, of a separator having a series of independent sections each receiving in succession a row of splints endwise direct from the cutting means, and separating them into independent rows at a point away from and clear of the cutting means, and a carrier receiving in succession the separated splints from the separator-sections.

14. In a match-making machine, the combination with splint-cutting means, of a separator having a series of circularly-moving and independent sections each receiving in succession a row of splints endwise and separating them into more than two independent rows, holding means for the splints, and means for moving the sections out of the circle of movement to place them in the holding means.

15. In a match-making machine, the combination with splint-cutting means, of a separator having a series of revoluble and independent sections each receiving in succession a row of splints endwise direct from the cutting means and separating them into more than two independent rows, and a carrier receiving in succession the rows of splints from the separator-sections.

16. A match-making machine, comprising splint-cutting means, a separator having a series of intermittent revoluble and independent sections each receiving in succession a row of splints and separating them into a series of independent rows, holding means for the splints, and means acting on the separator during a part of its rotary movement to remove fiber, dust and the like therefrom.

17. In a match-making machine, the combination with splint-cutting means, of a separator having a series of intermittent revoluble and independent sections each receiving splints and separating them into independent rows, a carrier, and means for moving the separator-sections in succession toward the carrier to place the separated splints therein.

18. In a match-making machine, the combination with splint-cutting means, of a separator having a series of revoluble independent sections each receiving the splints endwise direct from the cutting means and separating them into independent rows, and means for moving the separator-sections in succession toward the carrier to place the separated splints therein.

19. In a match-making machine, the combination with splint-cutting means, of a separator having a series of circularly-moving and independent sections each receiving the splints endwise in succession and separating them into independent rows, means for moving the sections independent of the circular movement, and a carrier receiving the separated splints successively from the different sections during their independent movement.

20. In a match-making machine, the combination with splint-cutting means, of a movable separator having a series of independent sections each receiving the splints endwise in succession and separating them into independent rows, a carrier, and means for moving the sections independent of the movement of the separator as a whole to place the splints in the carrier.

21. In a match-making machine, the combination with splint-cutting means, of a separator having a series of circularly-moving and independent sections each receiving the splints endwise direct from the cutting means and separating them into more than two independent rows, a carrier, and means for moving the sections independent of the rotary movement toward the carrier to place the splints therein.

22. In a match-making machine, the combination of splint-cutting means, a movable separator having a series of independent sections each receiving the splints endwise in succession and separating them into more than two independent rows, a carrier, and means for successively moving the sections independent of the movement of the separator as a whole to place the splints in the carrier.

23. In a match-making machine, the combination with splint-cutting means, of a movable separator having a series of more than two independent sections each receiving the splints endwise in succession and separating them in independent rows, a carrier, and means for successively moving the separate sections in a different direction of the separating movement and toward the carrier to place the splints in said carrier.

24. In a match-making machine, the combination with a movable separator having a series of sections each receiving the splints endwise in succession direct from the cutting means and separating and moving them away from and clear of the cutting means to one side thereof, a carrier, together with means for successively reciprocating the sections to force the splints in the carrier.

25. In a match-making machine, the combination with splint-cutting means, of a separator comprising a series of circularly-moving and independent sections each provided with relatively stationary and movable members which separate the splints into independent rows, and holding means for the splints.

26. In a match-making machine, the combination with splint-cutting means, of a separator comprising a series of circularly-moving and independent sections each provided with relatively stationary and movable members receiving the splints in succession and which separate the splints into independent rows at a point away from and clear of the cutting means, and a carrier receiving in succession the separated splints from the separator-sections, substantially as and for the purpose described.

27. In a match-making machine, the combination with splint-cutting means, of a separator having a series of revoluble and independent sections each provided with movable and stationary members receiving the splints endwise in succession direct from the cutting means and which separate the splints into independent rows, and holding means for the splints.

28. In a match-making machine, the combination with splint-cutting means, of a separator having a series of circularly-moving and independent sections each provided with movable and stationary members receiving the splints endwise in succession and which separate the splints into more than two independent rows, and holding means for the splints.

29. In a machine for making matches, the combination with splint-cutting means, of a separator having a series of circularly-moving and independent sections each provided with movable and stationary members receiving a row of splints endwise in succession and which separates them into independent rows, holding means for the splints, and means for successively moving the sections out of the circle of their movement to forcibly insert the splints into the holding means.

30. In a machine for making matches, the combination with splint-cutting means, of a separator comprising a series of circularly-moving and independent sections each provided with movable and stationary members receiving the splints endwise in succession and which separates the splints into more than two independent rows, a carrier, and means for moving the sections out of their circle of movement to forcibly insert the splints into the holding means.

31. In a match-making machine, the combination with splint-cutting means, of a separator comprising a series of circularly-moving and independent sections each provided with movable members receiving the splints endwise in succession and separating them into a series of more than two independent rows at a point away from and clear of the cutting means, a carrier adapted to hold splints, and means for successively moving the sections out of the circle of their movement to forcibly insert the splints into the carrier, substantially as and for the purpose described.

32. In a match-making machine, the combination with splint-cutting means cutting the splints in a close row, of a separator having a series of circularly-moving independent sections each provided with movable members and receiving the splints endwise in succession and separating them away from and clear of the cutting means, a carrier, and means for successively moving the sections out of the circle of movement toward and from the carrier to forcibly insert and leave the splints in said carrier.

33. In a match-making machine, the combination with splint-cutting means, of a separator having a series of four circularly-moving and independent sections each provided with movable members and receiving the splints endwise in succession and separating them into independent rows, and holding means receiving the successive sets or rows of splints from the separator.

34. In a match-making machine, the combination with splint-cutting means, of a movable separator having a series of four independent sections each provided with movable members and receiving the splints endwise in succession and separating them into independent rows, a carrier, and means for successively moving the sections toward and from the carrier to forcibly insert and leave the splints in said carrier.

35. In a match-making machine, the combination with splint-cutting means, of a separator having a series of circularly-moving and independent sections each provided with movable members and receiving the splints endwise in succession and separating them into more than two independent rows, a carrier, together with means for successively moving the sections out of the circle of movement toward and from the carrier to forcibly insert and leave the splints in said carrier.

36. In a match-making machine, the combination with splint-cutting means, of a movable separator having a series of more than two independent sections each provided with movable members and receiving the splints endwise in succession and separating them into more than two independent rows, holding means for the splints, together with means for successively moving the sections toward and away from the holding means to forcibly insert and leave the splints in said holding means.

37. In a match-making machine, the combination with splint-cutting means, of a separator having a series of circularly-moving and independent sections each provided with movable members and receiving a row or line of splints endwise in succession and separating them into independent rows, a carrier, together with means for successively moving the sections out of the circle of movement toward and from the carrier to place and leave the splints in said carrier.

38. In a match-making machine, the combination with splint-cutting means, of a separator having a series of intermittent circularly-moving independent sections provided with movable and stationary members and receiving a row or line of splints endwise in succession and separating them into independent rows, a carrier, together with means for successively moving the sections out of the circle of rotation of movement toward and from the carrier to forcibly insert and leave the splints in said carrier.

39. In a match-making machine, the combination with splint-cutting means, of a series of revoluble and reciprocatory sections each independent of the other and receiving splints endwise in succession and separating them into independent rows, a carrier, together with means for successively reciprocating the sections to forcibly insert the splints in the carrier.

40. In a match-making machine, the combination with splint-cutting means, of a series of movable sections each independent of the other and receiving splints endwise and separating them into independent rows, a carrier, and means for successively moving the sections to place and leave the splints in said carrier.

41. In a match-making machine, the combination with splint-cutting means, of a series of revoluble independent sections each provided with movable members and receiving a row or line of splints endwise in succession and separating the splints into more than two independent rows, a carrier, and means for successively reciprocating the sections toward and from the carrier to forcibly insert and leave the splints in said carrier, substantially as and for the purpose described.

42. In a match-making machine, the combination with a splint-cutting means, of a series of movable independent sections each having holding devices and holding the splints endwise and separated into independent rows, a carrier, and means for successively moving the sections independently of each other toward and from the carrier to place the splints in said carrier.

43. In a match-making machine, the combination with splint-cutting means, of a series of revoluble independent sections each having holding devices for the splints and holding the latter endwise and separated into independent rows, a carrier, and means for successively reciprocating the sections to forcibly stick the splints in the carrier.

44. In a match-making machine, the combination with splint-cutting means, of a series of revoluble independent sections each having holding devices for the splints and holding the latter endwise and separated into more than two independent rows, a carrier, and means for successively reciprocating the sections to forcibly stick the splints in the carrier.

45. In a match-making machine, the combination with splint-cutting means, of a carrier, and a revoluble and reciprocatory section receiving the splints endwise direct from the cutting device and separating the splints into independent rows and forcibly inserting them into said carrier.

46. In a match-making machine, the combination with splint-cutting means, a revoluble and reciprocatory section provided with stationary and movable members and receiving the splints endwise and separating them into independent rows, and a carrier receiving the separated splints from the section during the reciprocatory movement.

47. In a match-making machine, the combination with splint-cutting means, of a revoluble and reciprocatory separator-section receiving the splints endwise and separating them into more than two independent rows, and holding means receiving the separated splints during the reciprocatory movement of the section.

48. In a match-making machine, the combination with splint-cutting means, of a revoluble and reciprocatory separator-section receiving a row or line of splints endwise direct from the cutting means and separating them into a series of more than two independent rows, and holding means receiving the separated splints during the reciprocatory movement of the section.

49. In a match-making machine, the combination with splint-cutting means, of a revoluble and reciprocatory separator-section provided with relatively movable and stationary members receiving the splints endwise and separating them into independent rows, and holding means receiving the separated splints endwise during the reciprocatory movement of the separator-section, substantially as and for the purpose described.

50. In a match-making machine, the combination with splint-cutting means, of a revoluble and reciprocatory separator-section provided with relatively movable and stationary members receiving the splints endwise direct from the cutting means, and separating them into more than two independent rows, and a carrier receiving the separated splints endwise during the reciprocatory movement of the separator-section.

51. In a match-making machine, the combination with splint-cutting means, of a revoluble and reciprocatory separator-section provided with independent slidable and stationary members receiving the splints endwise direct from the cutting means, and separating them into independent rows, and holding means receiving the separated splints during the reciprocatory movement of the separator-section.

52. In a match-making machine, the combination with splint-cutting means, of a revoluble section having holding devices for the splints and holding them endwise and separated into independent rows, a carrier, and means for moving the section out of the circle of motion toward and from the carrier to place and leave the splints in said carrier.

53. In a match-making machine, the combination with means for cutting splints, of a revoluble section having holding devices receiving the splints endwise and separating them into independent rows, a carrier, and means for moving the section out of the circle of motion toward and from the carrier to place and leave the splints in said carrier.

54. In a match-making machine, the combination with means for cutting splints, of a revoluble separator-section having holding devices receiving the splints endwise direct from the cutting means and separating them into more than two independent rows, a carrier, and means for reciprocating the section to forcibly stick the splints in the carrier, substantially as and for the purpose described.

55. In a match-making machine, the combination with means for cutting splints, of a movable separator-section having independent movable and stationary members receiving a row of splints endwise direct from the cutting means and separating them into more than two independent rows, a carrier, and means for reciprocating the section to place the splints in the carrier.

56. In a match-making machine, the combination with means for cutting splints, of a revoluble separator-section having holding devices receiving the splints endwise in a common plane and separating them into more than two independent rows in a direction at right angles to the plane in which they are received, a carrier, and means for reciprocating the section to forcibly insert the splints in the carrier.

57. In a match-making machine, the combination with splint-cutting means, and means for feeding veneer to the cutting means, of a revoluble separator-section having holding devices receiving the splints endwise in a common plane direct from the cutting means and separating them into more than two independent rows in a plane at right angles to the plane in which they are received, a carrier, and means for reciprocating the section to forcibly insert the splints in the carrier.

58. In a match-making machine, the combination with splint-cutting means, and means for feeding veneer to the cutting means, of a separator comprising a series of intermittent and circularly-moving independent sections each receiving in succession a row or line of splints endwise and separating them into more than two independent rows in a plane at right angles to the plane in which the splints are received, a carrier, and means for moving the section out of the plane of circular motion toward and from the carrier to place and leave the splints in said carrier, substantially as and for the purpose described.

59. In a match-making machine, the combination with splint-cutting means and means for feeding veneer to the cutting means, of a separator comprising a series of revoluble and independent sections each receiving in succession a row or line of splints endwise direct from the cutting means and separating them into more than two independent rows in a plane at right angles to the plane in which they are received and held before separation, a carrier, and means for successively reciprocating the sections toward and from the carrier to forcibly insert and leave the splints in said carrier.

60. In a match-making machine, the combination with splint-cutting means, and means of feeding veneer to the cutting means, of a series of independent sections each provided with independent movable and stationary members receiving in succession a row or line of splints endwise direct from the cutting means and separating them into independent rows in a plane at right angles to the plane in which they are received and held before separation, means for imparting a circular movement to the sections, and means for successively reciprocating the sections to place and leave the splints in said carrier.

61. In a match-making machine, the combination with splint-cutting means, and means for feeding veneer to the cutting means, of a series of independent sections each provided with independent slidable and stationary members or plates having holding devices receiving in succession a row or line of splints endwise direct from the cutting means and separating them into more than two independent rows in a plane at right angles to the plane in which they are received and held prior to separation, means for imparting a circular movement to the sections, a carrier, and means for successively reciprocating the sections to forcibly insert and leave the separated splints in said carrier, substantially as and for the purpose described.

62. In a match-making machine, the combination with means for supplying splints, of a series of independent sections each having means for separating the splints into independent rows, means for revolving the sections in unison, a carrier, and means for successively moving the sections out of the circle of motion to place the separated splints in the carrier, substantially as described.

63. In a match-making machine, the combination with means for supplying splints, of a series of independent sections each receiving in succession a row or line of splints endwise and separating them into independent rows, means for moving the sections in unison, a carrier, and means for successively moving the sections out of the path of its former movement to place the splints in the carrier.

64. In a match-making machine, the combination of means for supplying splints, a series of independent sections each having independent members arranged in sets which receive the splints endwise in succession and separate them into independent rows, means for moving the sections in unison, a carrier, and means for successively moving the sections out of the path of its former movement to place the splints in the carrier, substantially as described.

65. In a match-making machine, the combination with means for supplying splints, of a series of independent sections each having means for separating the splints into more than two independent rows, means for moving the sections in unison, a carrier, and means for successively moving the sections out of the path of its former movement to place the splints in the carrier.

66. In a match-making machine, the combination with means for supplying splints, of a series of independent sections each receiving in succession a row of splints endwise and separating them into more than two independent rows, means for moving the sections in unison, a carrier, together with means for successively reciprocating the sections to forcibly insert the splints in the carrier.

67. In a match-making machine, the combination with means for supplying splints, of a revoluble and reciprocatory separator-section receiving a row or line of splints endwise and separating them into more than two independent rows, and a carrier receiving the splints from the separator-section during the reciprocatory movement thereof.

68. In a match-making machine, the combination with means for supplying splints, of a separator-section receiving a row or line of splints endwise and separating them into more than two independent rows in a plane at right angles to that in which they are received, means for moving the separator-section, a carrier, and means for reciprocating the section toward the carrier to stick the splints in the carrier.

69. In a match-making machine, the combination with means for supplying splints, of a separator-section having independent relatively movable and stationary members provided with holding devices receiving the splints endwise and separating them into independent parallel rows, means for revolving the section, a carrier, and means for reciprocating the section to force and leave the splints in the carrier.

70. In a match-making machine, the combination with means for supplying splints, of a revoluble section having holding devices receiving the splints endwise and holding the latter endwise and separated into more than two independent rows, a carrier, and means for reciprocating the section to force and leave the splints in the carrier.

71. In a match-making machine, the combination with means for supplying splints, of a separator-section having a series of substantially T-shaped members or plates arranged in sets, means for moving the sets to separate the splints into independent rows, and holding means for the splints.

72. In a match-making machine, the combination with means for supplying splints, of a separator-section having a series of substantially T-shaped members or plates arranged in independent movable and stationary sets, means for operating the sets to separate the splints into independent rows, and holding means for the splints.

73. In a match-making machine, the combination with means for supplying splints, of a series of movable independent sections receiving the splints endwise in succession and each having independent movable and stationary members arranged in sets, means for operating the sets to separate the splints into independent rows, holding means for the splints, and means for successively reciprocating the sections to place the splints in the holding means.

74. In a match-making machine, the combination with means for supplying splints, of a series of independent sections receiving the splints endwise and separating them into independent rows, wheels for revolving the sections, and means for successively moving the sections radially in the wheels, and holding means for the splints.

75. In a match-making machine, the combination with means for supplying splints, of a separator-section receiving the splints and separating them into independent rows, wheels for revolving the section and having a sliding connection with the section, a carrier, and means for moving the section radially in the wheels.

76. In a match-making machine, the combination with means for supplying splints, of a separator-section receiving the splints endwise and separating them into independent rows, means for revolving the section in which the latter is slidingly held, a carrier, and means for forcing the section out of the circle of motion to stick the splints in the carrier.

77. In a match-making machine, the combination with means for supplying splints, of a separator-section receiving the splints endwise and separating them into a series of more than two independent rows, means for moving the section in which the latter is slidingly held, a carrier, and means for forcing the section out of the plane of its former movement to stick the splints in the carrier.

78. In a match-making machine, the combination with means for supplying splints, of a separator-section receiving the splints endwise and separating them into more than two independent rows, rotary wheels having a sliding connection with the section, a carrier, and means for forcing the section radially in the wheels to stick the splints in the carrier.

79. In a match-making machine, the combination with means for supplying splints, of a series of separator-sections receiving in succession the splints endwise and separating them into independent rows, rotary wheels in which the sections are slidingly held, a carrier, and means for successively forcing the sections radially to stick the splints in the carrier.

80. In a match-making machine, the combination with means for supplying splints, of a series of separator-sections receiving in succession the splints endwise and separating them into independent rows, rotary wheels in which the sections are slidingly held, disks having grooves therein in which the ends of the sections normally move, a carrier, and means for successively reciprocating the sections to stick the separated splints in the carrier, substantially as described.

81. In a match-making machine, the combination with means for supplying splints, of a series of separator-sections receiving in succession the splints endwise in a row and separating them into more than two independent rows, rotary wheels in which the sections are slidingly held, stationary disks having annular grooves in which the ends of the sections normally move, a carrier, and bars for successively forcing the sections radially to place the splints in the carrier.

82. In a match-making machine, the combination with means for supplying splints, of a series of independent separator-sections each receiving the splints endwise and provided with independent movable and stationary members arranged in sets, eccentrically-moving blocks operatively connected with the movable sets or members of each section and operating said members to separate the splints into independent rows, and holding means for the splints.

83. In a match-making machine, the combination with means for supplying splints, of a series of independent separator-sections each receiving the splints endwise and provided with independent movable and stationary members or plates arranged in sets, cross-bars to which the movable members are secured, eccentrically-moving blocks having staggered arms operatively connected by a tongue and groove with the cross-bars of the movable sets or members of each section and operating said members to separate the splints into independent rows, rotary wheels in which the sections are slidingly held, a carrier, and means for successively moving the sections radially to stick the splints in said carrier.

84. In a match-making machine, the combination with means for supplying splints, of a series of independent separator-sections, receiving in succession the splints, and provided with independent movable and stationary members or plates arranged in sets, eccentrically-moving blocks operatively connected with the movable sets or members of each section and operating said members to separate the splints into more than two independent rows, rotary wheels in which the sections are slidingly held, stationary disks having annular grooves in which the ends of the sections normally move, a carrier, and means for successively forcing the sections radially to place the splints in the carrier.

85. In match-making machinery, the combination with splint-cutting means, of an intermittently-movable separator comprising a series of more than two independent separator-sections each provided with a plurality of separable splint-receivers adapted to receive a single match-splint, means for delivering the splints each to its individual receiver, means for separating the said receivers, and holding means for the splints.

86. In match-making machinery, the combination with splint-cutting means, of an intermittently-movable separator comprising a series of independent separator-sections each provided with a plurality of separable splint-receivers that are adapted to receive a single match-splint, means for delivering the splints each to its individual receiver, a carrier, and means for successively moving the sections toward the carrier to stick and leave the splints in said carrier.

87. In match-making machinery, the combination with splint-cutting means, of a series of more than two independent sections each forming an individual separator, and provided with a plurality of separable splint-receivers that are adapted to receive a single match-splint, means for delivering the splints each to its individual receiver, independently of any of the other said receivers, means for separating the receivers, a carrier, together with means for successively reciprocating the sections to stick and leave the splints in the carrier.

88. In match-making machinery, the combination with means for supplying splints, of a series of more than two movable independent separator-sections, each provided with a set of separable splint-receivers, comprising three or more such receivers arranged in one series, and adapted to receive the splints from the splint-supplying means, and means for separating such receivers.

89. In match-making machinery, the combination with means for supplying splints, of a series of movable independent sections each provided with a set of separable splint-receivers, comprising three or more such receivers arranged in one series and adapted to receive splints from the splint-supplying means, means for separating such receivers, a carrier, together with means for reciprocating the receivers to stick and leave the splints in the carrier.

90. In match-making machinery, the combination with splint-cutting mechanism, of a set of separable splint-receivers comprising three or more such receivers arranged in one series, and adapted to receive splints from the cutting mechanism, means for separating such receivers, a carrier, together with means for reciprocating the receivers to stick and leave the splints in the carrier.

91. In match-making machinery, the combination with means for supplying splints, of a plurality of separable splint-receivers each adapted to receive a single match-splint, means for delivering the splints each to its individual receiver, independent of any of the other said receivers, means for separating the said receivers, a carrier, together with means for reciprocating the receivers to stick and leave the splints in the carrier.

92. In match-making machinery, the combination with splint-cutting means, of an intermittently-movable separator having a series of four independent separators or sections each provided with a set of separable splint-receivers comprising three or more such receivers arranged in one series and adapted to receive splints endwise, and means for separating such receivers.

93. In match-making machinery, the combination with splint-cutting means, of a separator comprising a series of more than two circularly-moving and independent separator-sections each provided with a plurality of separable splint-receivers that are adapted each to receive a single match-splint, means for delivering the splints each to its individual receiver, and means for separating the said receivers.

94. In match-making machinery, the combination with splint-cutting mechanism, of a separator comprising a series of circularly-moving and independent sections each provided with a set of separable splint-receivers comprising three or more such receivers arranged in one series, and adapted to receive splints from the cutting mechanism, and means for separating such receivers.

95. In match-making machinery, the combination with a series of more than two movable sections each independent of the other, and each provided with a set of separable splint-receivers comprising three or more such receivers arranged in one series and adapted to receive the splints endwise, and means for separating such receivers.

96. In match-making machinery, the combination with means for supplying splints, of a revoluble section having a plurality of separable splint-receivers, each adapted to receive a single match-splint, means for delivering the splints each to its individual receiver independently of any of the other said receivers, means for separating the said receivers, a carrier, and means for moving the receivers toward and from the carrier to place and leave the splints in said carrier.

97. In match-making machinery, the combination with means for cutting splints, of a movable separator-section having a set of separable splint-receivers comprising three or more such receivers arranged in one series and adapted to receive the splints endwise, means for separating such receivers, a carrier, together with means for reciprocating the receivers to force or place the splints in the carrier.

98. In match-making machinery, the combination with means for supplying splints, of a series of independent sections or devices adapted to hold separated splints, means for moving the sections in unison, a holding or dipping carrier, together with means for successively reciprocating the sections to stick and leave the splints in the carrier.

99. In a match-making machine, the combination with means for supplying splints, of a series of independent sections receiving the splints endwise and holding them separated, wheels for revolving the sections, and means for successively moving the sections radially in the wheels, and holding means for the splints.

100. In a match-making machine, the combination with means for supplying splints, of a section receiving the splints endwise and holding them separated, wheels for revolving the section and having a sliding connection with the section, a carrier, and means for moving the section radially in the wheels.

101. In a match-making machine, the combination with means for supplying splints, of a section receiving the splints endwise and holding them separated in independent rows, means for revolving the section in which the latter is slidingly held, a carrier, and means for forcing the section out of the circle of rotation to stick the splints in the carrier.

102. In a match-making machine, the combination with means for supplying splints, of a series of sections receiving the splints in succession and holding them separated, rotary wheels in which the sections are slidingly held, a carrier, and means for successively forcing the sections radially to stick the splints in the carrier.

103. In a machine for making matches, the combination with means for supplying splints, of a series of sections receiving in succession the splints endwise and holding them separated, rotary wheels in which the sections are slidingly held, disks having grooves therein in which the ends of the sections normally move, a carrier, and means for successively reciprocating the sections to stick the splints in the carrier.

104. In a match-making machine, the combination with means for supplying splints, of a series of separator-sections receiving in succession the splints endwise and holding them separated in independent rows, rotary wheels in which the sections are slidingly held, stationary disks having annular grooves in which the ends of the sections normally move, a carrier, and bars for successively forcing the sections radially to place the splints in the carrier.

105. In a match-making machine, the combination with means for supplying splints, of a carrier comprising two traveling cables, and independent splint-holding sections or plates having yielding jaws removably holding the sections to the cables.

J. A. EKIN CRISWELL.

Witnesses:
R. W. BISHOP,
F. C. GLORIUS.